United States Patent
Rogers et al.

(10) Patent No.: US 9,344,327 B2
(45) Date of Patent: May 17, 2016

(54) WIRELESS-BASED NETWORK MANAGEMENT

(75) Inventors: Harry Rogers, Bellevue, WA (US);
Sriram Sankar, Redmond, WA (US);
Jie Liu, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1063 days.

(21) Appl. No.: 13/452,252

(22) Filed: Apr. 20, 2012

(65) Prior Publication Data

US 2013/0282885 A1  Oct. 24, 2013

(51) Int. Cl.
*G06F 15/173* (2006.01)
*H04L 12/24* (2006.01)
*H04W 24/02* (2009.01)

(52) U.S. Cl.
CPC ........... *H04L 41/0672* (2013.01); *H04W 24/02* (2013.01)

(58) Field of Classification Search
CPC ..................... H04L 41/0213; H04L 29/08072; H04L 29/06
USPC ........................................................ 709/223
See application file for complete search history.

(56) References Cited

U.S. PATENT DOCUMENTS

| | | | | |
|---|---|---|---|---|
| 2005/0210144 | A1* | 9/2005 | Kumagai et al. | 709/229 |
| 2008/0112422 | A1* | 5/2008 | Jetcheva et al. | 370/406 |
| 2010/0061394 | A1 | 3/2010 | Sindhu et al. | |
| 2010/0172292 | A1 | 7/2010 | Ramachandran et al. | |
| 2011/0197082 | A1* | 8/2011 | Ingels et al. | 713/310 |
| 2011/0218689 | A1* | 9/2011 | Chan et al. | 700/295 |
| 2011/0243074 | A1 | 10/2011 | Shin et al. | |
| 2011/0245988 | A1* | 10/2011 | Ingels et al. | 700/295 |
| 2012/0054527 | A1* | 3/2012 | Pfeifer et al. | 713/340 |
| 2012/0110155 | A1* | 5/2012 | Adlung et al. | 709/223 |
| 2013/0047153 | A1* | 2/2013 | Emaru | 718/1 |
| 2013/0254566 | A1* | 9/2013 | Florez-Larrahondo et al. | 713/310 |

OTHER PUBLICATIONS

Wikpedia page on AV Receiver, retrieved from https://en.wikipedia.org/wiki/AV_receiver on Oct. 23, 2015, 5 pages.
Shin, et al., "On the Feasibility of Completely Wireless Data Centers", Retrieved at <<http://dspace.library.cornell.edu/bitstream/1813/22846/2/WDC.pdf>>, Computing and Information Science Technical Reports, May 3, 2011, pp. 13.

(Continued)

*Primary Examiner* — Nicholas Taylor
*Assistant Examiner* — Chong G Kim
(74) *Attorney, Agent, or Firm* — Henry Gabryjelski; Kate Drakos; Micky Minhas

(57) ABSTRACT

Embodiments of network systems, computing systems, devices, components, modules, routines, and processes are described herein. In one embodiment, a network system includes a computing unit and a management controller configured to control a device operation of the computing unit. The device operation includes at least one of an operation to power up, an operation to power down, an operation to reset, an operation to power cycle, or an operation to refresh the computing unit. The network system also includes a wireless element configured to allow wireless communication between the computing unit and the management controller.

20 Claims, 9 Drawing Sheets

(56) References Cited

OTHER PUBLICATIONS

Katayama, et al., "Wireless Data Center Networking with Steered-Beam mmWave links", Retrieved at <<http://ieeexplore.ieee.org/stamp/stamp.jsp?tp=&arnumber=5779470>>, IEEE Wireless Communications and Networking Conference (WCNC), Mar. 28, 2011, pp. 2179-2184.

Halperin, et al., "Augmenting Data Center Networks with Multi-Gigabit Wireless Links", Retrieved at <<http://research.microsoft.com/pubs/157700/flyways_sigcomm11.pdf>>, Proceedings of the ACM SIGCOMM 2011 conference on SIGCOMM, Aug. 16, 2011, pp. 38-49.

Ramachandran, et al., "60 GHz Data-Center Networking: Wireless Worry less?", Retrieved at <<http://www.nec-labs.com/~kishore/papers/60GHz-DC.pdf>>, Jul. 14, 2008, pp. 11.

"Out of Band Network Management in the Data Center", Retrieved at <<http://www.wti.com/t-wti-white-paper-oobdc.aspx>>, Retrieved Date Jan. 24, 2012, pp. 3.

* cited by examiner

WIRELESS-BASED NETWORK MANAGEMENT

BACKGROUND

Datacenters are computing systems or facilities that include network servers, telecommunication equipment, network storage devices, and/or other computing devices. Datacenters typically include multiple computing units (e.g., servers for implementing network-accessible services) that are organized in racks of individual computer cabinets and coupled by a data network. For example, each rack may include a rack-level communication mechanism (e.g., a backplane channel) for routing data to and from other computing units within the rack. One or more upper-level communication mechanisms (e.g., a top-of-rack switch) may couple multiple racks to one another and/or to external devices.

Datacenters can also include a management network independent of the data network for communicating with and controlling device operations of computing units. For example, a management controller can send instructions to and receive feedback from individual computing units via the management network. The instructions can include power up, power down, reset, power cycle, refresh, and/or other suitable device operations. The feedback can include current or historical operating conditions and/or other information of the computing units. System administrators can thus monitor operations with the management network even in the absence of any operating systems or when a host operating system is not functioning.

SUMMARY

The present technology is directed to wireless-based network management. In one aspect, the present technology is directed to a management network system configured to control device operation of computing units using wireless communication. In one embodiment, the management network includes multiple management controllers and wireless elements individually coupled to computing units. In other embodiments, the management network may include one wireless communication element per rack, per computer cabinet, or per other suitable grouping of computing units. One computing unit may be designated as a primary management controller, and another as a secondary management controller. In the event of a failure of either the primary or the secondary management controller, one of the other computing units may be designated as a replacement. As a result, the management network may be flexibly reconfigured on an ad hoc basis. Thus, different network routes may be generated between the primary and/or secondary management controllers and the computing units such that control messages may be reliably delivered.

In another aspect, the present technology is directed to a method of operating and/or managing computing units in a computing system (e.g., a datacenter). In one embodiment, the computing system includes a data network independent from a wireless management network. The method includes routing network data to and from the computing units via the data network, and communicating with and controlling device operations of the computing units via the management network. When the data network is unavailable for certain computing units, in certain embodiments, the method can include routing network data to and from these computing units via the wireless management network. Optionally, the method can also include adjusting operation of these computing units to reduce a communication bandwidth demand from a prior level. In other embodiments, the method can also include utilizing the wireless management network for communication load balancing, peer-to-peer communication, background traffic, and/or other suitable operations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various embodiments of network systems, devices, components, modules, routines, and processes are described below. In the following description, example software codes, values, and other specific details are included to provide a thorough understanding of various embodiments of the present technology. A person skilled in the relevant art will also understand that the technology may have additional embodiments. The technology may also be practiced without several of the details of the embodiments described below with reference to FIGS. 1-9.

Computing systems such as datacenters can have a management network for communicating with and controlling device operations of computing units. Conventional management networks typically have a fixed topology using a wired network, and thus have little or no flexibility for reconfiguration without rewiring. In addition, datacenters normally include redundant networks for system availability. Thus, datacenters may include at least two sets of redundant management networks wired to each computing unit. Design and installation of such redundant networks can be costly and labor intensive. Even with such redundancy, failure of all management networks can cause difficulty for system administrators to perform device operations on the computing units.

Further, wire-based management networks are not economical because of their low usage compared to high costs of construction and maintenance.

Several embodiments of the present technology can address at least some of the foregoing difficulties by utilizing a wireless-based management network in datacenters and/or other suitable computer systems. As used herein, the term "wireless" may, for example, refer to a communication mode under which information is transferred between two or more points that are not physically connected. Examples of wireless communication can include radio frequency (e.g., WI-FI, Bluetooth, ultra-wide band, etc.), microwave, infrared, free space optics (e.g., using laser or light emitting diodes), near field, or other suitable types of communication.

Figure 1:
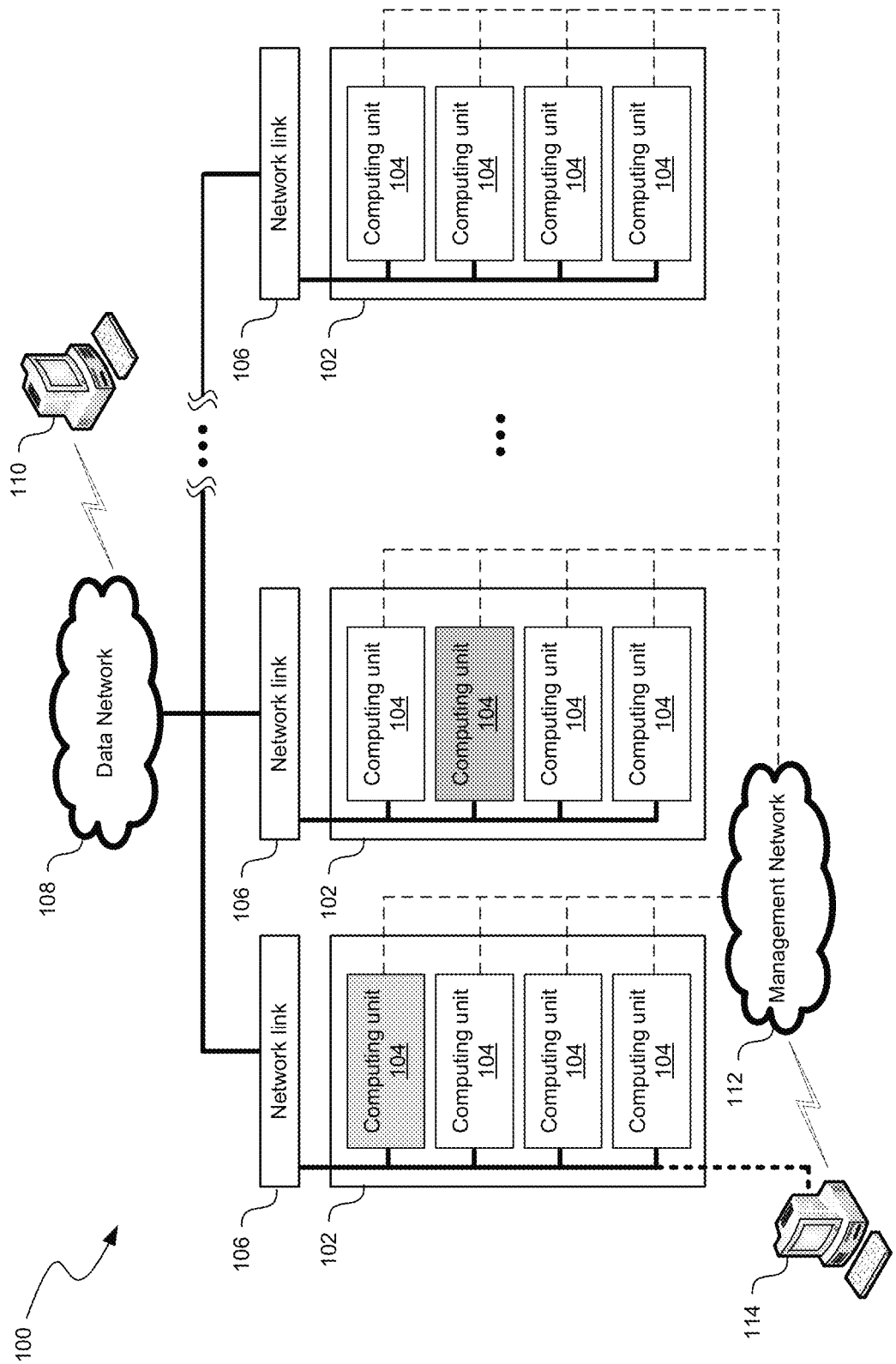
FIG. 1 is a schematic block diagram illustrating a network system in accordance with embodiments of the present technology.

FIG. 1 is a schematic block diagram illustrating a communication framework in a datacenter 100 in accordance with embodiments of the present technology. As shown in FIG. 1, the datacenter 100 can include multiple computer cabinets 102 individually housing multiple computing units 104, a data network 108 coupled to a client device 110, and a wireless management network 112 coupled to a management station 114. Optionally, the management station 114 (e.g., a desktop computer) may also be coupled to the data network 108 (shown in phantom lines for clarity). In other embodiments, the wireless management network 112 may also be coupled to the client device 100. Even though particular components are shown in FIG. 1, in further embodiments, the datacenter 100 can also include power supplies, cooling systems, power backup systems, and/or other suitable components. In yet further embodiments, embodiments of the described communication framework can be implemented in suitable network systems other than datacenters.

The computer cabinets 102 can have any suitable shape and/or size to house the computing units 104 in racks and/or in other suitable groupings. The computing units 104 can be configured to implement one or more applications accessible by the client device 110 (e.g., a desktop computer, a smart phone, etc.) and/or other entities via a wide area network (e.g., the Internet) or through any other coupling mechanisms. Certain embodiments of a computing unit 104 are described in more detail below with reference to FIG. 2. FIG. 1 shows four computing units 104 in each computer cabinet 102 for illustration purposes. In other embodiments, individual computer cabinets 102 can also include any suitable number of computing units, fans, intercoolers, and/or other suitable electrical and/or mechanical components.

In the illustrated embodiment, the data network 108 and the wireless management network 112 are independent of each other. As used herein, the phrase "independent" in the context of networks generally refers to a network not being contingent on conditions of another for operation. As a result, the data network 108 and the wireless management network 112 may operate irrespective of an operating condition of the other. In other embodiments, the data network 108 and the wireless management network 112 may be combined in a suitable fashion. For example, the wireless management network 112 may rely upon a portion of the data network 108 for access to the individual computing units 104, as described in more detail below with reference to FIG. 5.

In certain embodiments, the data network 108 can include twisted pair, coaxial, untwisted pair, optic fiber, and/or other suitable hardwire communication media, routers, switches, and/or other suitable network components. In other embodiments, the data network 108 can also include a wireless communication medium. In further embodiments, the data network 108 can include a combination of hardwire and wireless communication media. The data network 108 may operate according to Ethernet, token ring, asynchronous transfer mode, and/or other suitable link layer protocols. In the illustrated embodiment, the computing units 104 of individual computer cabinets 102 are coupled to a network link 106 (e.g., a top-of-rack switch) associated with corresponding computer cabinet 102. The network links 106 are then coupled together to form the data network 108. In other embodiments, the data network 108 may include other suitable topologies, components, and/or arrangements.

In certain embodiments, the wireless management network 112 can include one or more management controllers and wireless elements 126 (shown in FIG. 2) in communication with the computing units 104. The one or more management controllers can be configured to control a device operation of the computing units 104. As used herein, the phrase "device operation" generally refers to an operation that may be performed even in the absence of an operating system. For example, the management controllers may power up, power down, reset, power cycle, refresh, and/or may perform other suitable device operations on a particular computing unit 104. The management controllers can also allow device operation by a system administrator (not shown) via the management station 114.

In certain embodiments, the management controllers can include a service of an operating system running on at least one of the computing units 104. For example, in the illustrated embodiment, two of the computing units 104 (shown with shadings in FIG. 1) are designated as primary and secondary management controllers. In other embodiments, the management controllers may also include remote controllers coupled to the computing units 104 via an external network (not shown) and the wireless management network 112.

The wireless management network 112 can utilize terrestrial microwave, communication satellites, cellular systems, WI-FI, wireless LANs, Bluetooth, infrared, near field communication, ultra-wide band, free space optics, and/or other suitable wireless techniques. The wireless management network 112 can also operate according to a protocol similar to or different from that of the data network 108. In the illustrated embodiment, the computing units 104 in the computer cabinets 102 are individually coupled (as shown with the phantom lines) to the wireless management network 112. In other embodiments, the computing units 104 may be coupled to the wireless management network 112 in groups and/or may have other suitable network topologies.

In operation, the computing units 104 may receive requests from the client device 110 via the data network 108. For example, a user (not shown) may request a web search via the client device 110. After receiving the request, one or more of the computing units 104 may perform the requested web search and generate relevant advertisements based on the search request. The computing units 104 then route the generated search results and advertisement as network data to the client device 110 via the data network 108 and other external networks (e.g., the Internet, not shown). Meanwhile, the management controllers can monitor and/or control device operations of the computing units 104 wirelessly.

Several embodiments of the datacenter 100 can be more economical than conventional datacenters by having the management network 112 as a wireless-based network. As a result, no or reduced wiring is needed in the datacenter 100, and thus saving costs in design and installation of the management network 112. In addition, configuration of the datacenter 100 can be less prone to error than conventional datacenters because wiring mistakes virtually always exist.

Several embodiments of the datacenter 100 can have higher fault tolerance than conventional datacenters. If one of the computing units 104 loses connection to the data network 108, the computing unit 104 can continue generating network data based on user requests and routing the network data through the wireless management network 112 to the client device 110. The management controllers may also adjust operating characteristics of the disconnected computing unit 104 to reduce a communication bandwidth demand for routing the network data below a target level. For example, the management controllers may assign the disconnected computing unit 104 to perform disk cleanup, virus scan, and/or other tasks that do not require large or any communication bandwidths. Once connection to the data network 108 is restored (e.g., by refreshing), the management controllers may assign other tasks to the computing unit 104. In other embodiments, the management controllers may shut down the computing unit 104, raise an alarm, and/or perform other suitable operations.

Several embodiments of the datacenter 100 can also have higher operating flexibility than conventional datacenters. In certain embodiments, the wireless management network 112 may be utilized for communication load balancing, peer-to-peer communication, background traffic, and/or other suitable operations when the data network 108 is available. For example, the management controllers and/or other network controllers may determine urgency, quality of service, and/or other characteristics of pending communication traffic. The management controllers may then route the communication traffic via the data network 108 and/or the wireless management network 112 based on the determined characteristics. For instance, if the communication traffic is related to a web search with high urgency, the management controllers would route the communication traffic through the data network 108, which is typically faster than the wireless management network 112.

Several embodiments of the datacenter 100 can have higher system availability than conventional datacenters. As discussed above, in conventional datacenters, if both sets of management networks fail, system administrators cannot easily perform device operations on the computing units. In certain embodiments, the management network 112 can establish an ad hoc network for accessing one of the computing units 104. The ad hoc network may be based on proactive, reactive, flow-oriented, hierarchical, host-specific, multicast, and/or other suitable routing protocols. For example, if a management controller fails, another computing unit 104 may be selected to replace the failed management controller. As a result, several embodiments of the datacenter 100 can potentially have as many backup management controllers as the number of computing units 104 in the datacenter 100, resulting in higher system availability than conventional datacenters.

Figure 2:
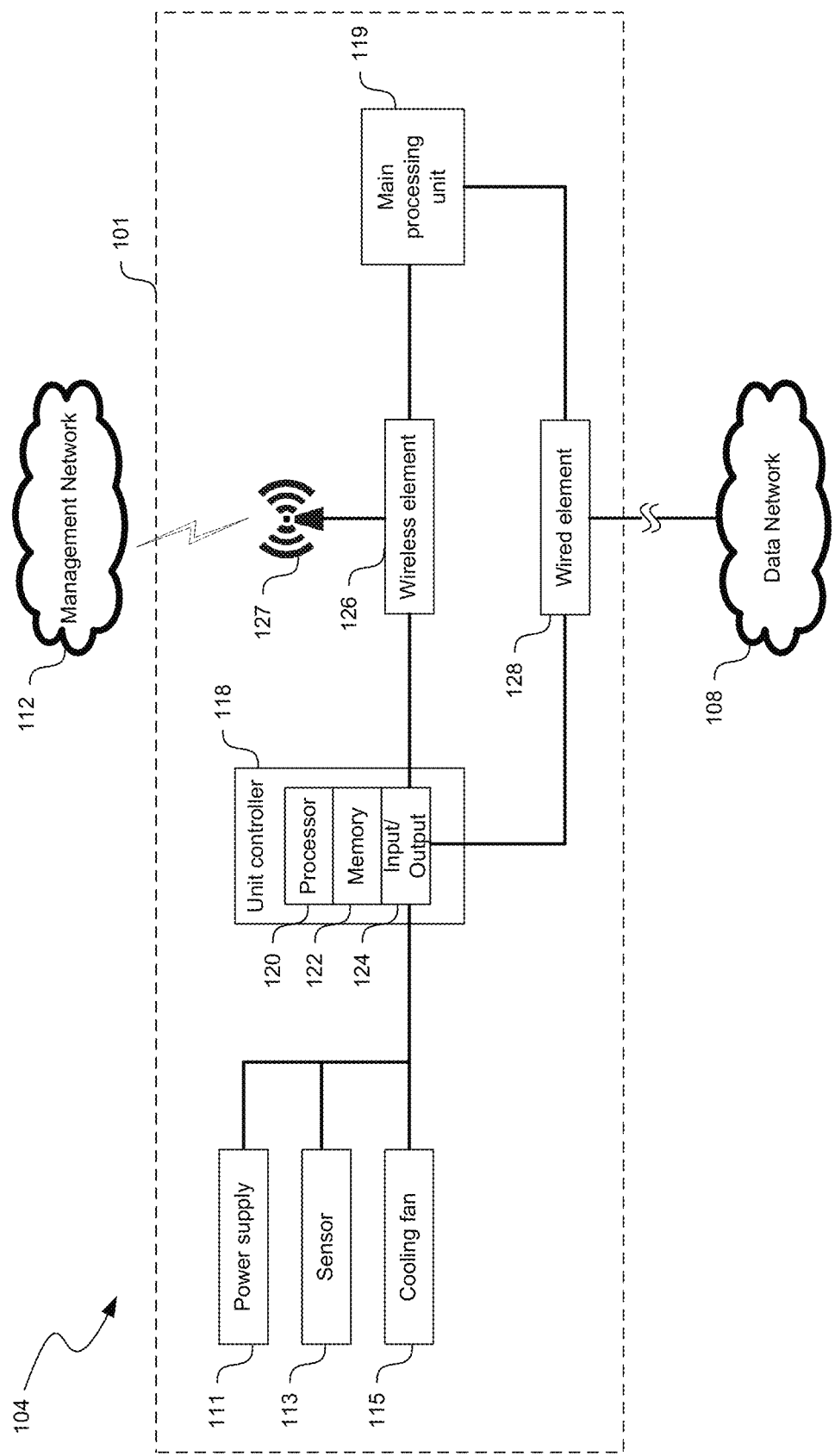
FIG. 2 is a schematic block diagram of a computing unit suitable for the network system in FIG. 1 in accordance with embodiments of the present technology.

FIG. 2 is a schematic block diagram of a computing unit 104 suitable for the datacenter 100 in FIG. 1 in accordance with embodiments of the present technology. As shown in FIG. 2, the computing unit 104 can include a motherboard 101 carrying a unit controller 118, a wireless element 126, a wired element 128, and a main processing unit 119. In other embodiments, the computing unit 104 can also include computer storage media (e.g., a solid-state drive), indicators (e.g., light emitting diodes), communication components (e.g., a backplane bus), and/or other suitable mechanical and/or electric components. In further embodiments, the computing unit 104 may not include all of the foregoing components.

The unit controller 118 is configured to monitor operating conditions and control device operations of components on the motherboard 101. As shown in FIG. 2, the unit controller 118 can include a processor 120 coupled to a memory 122 and an input/output component 124. The processor 120 can include a microprocessor, a field-programmable gate array, and/or other suitable logic devices. The memory 122 can include volatile and/or nonvolatile computer readable media (e.g., ROM; RAM, magnetic disk storage media; optical storage media; flash memory devices, EEPROM, and/or other suitable non-transitory storage media) configured to store data received from, as well as instructions for, the processor 120. In one embodiment, both the data and instructions are stored in one computer readable medium. In other embodiments, the data may be stored in one medium (e.g., RAM), and the instructions may be stored in a different medium (e.g., EEPROM). The input/output component 124 can include a digital and/or analog input/output interface configured to accept input from and/or provide output to other components of the computing units 104.

The main processing unit 119 is configured to accept and perform requested tasks from the client device 110 (FIG. 1). The main processing unit 119 can include components generally similar to those of the unit controller 118. As a result, descriptions of these components are omitted for clarity. Even though only one main processing unit 119 in shown in FIG. 2, in other embodiments, the computing unit 104 can include two, three, or any other number of main processing units 119.

The wireless element 126 is coupled to both the input/output component 124 of the unit controller 118 and to the main processing unit 119. The wireless element 126 is configured transmit sensor data, management instructions, network data, and/or other information to the wireless management network 112. In certain embodiments, the wireless element 126 may be analog or digital on a radio, cell phone, satellite, WIFI, Bluetooth, near field, ultra-wide band, and/or other suitable frequency band. The wireless element 126 can include a wireless network interface controller, a radio transmitter, and/or other suitable wireless components coupled to an antenna 127. In other embodiments, the wireless element 126 can include a light source (e.g., laser, light emitting diodes, etc.) and photoelectric sensors configured to sense an impending light. In further embodiments, the wireless element 126 can also include other suitable types of wireless components.

In the illustrated embodiment, the wireless element 126 is separate from the unit controller 118. In other embodiments, the wireless element 126 may be incorporated into the unit controller 118 on a common printed circuit board or on a single die. In further embodiments, the wireless element 126 may be incorporated into the main processing unit 119, the wired element 128, and/or other components of the computing unit 104.

The wired element 128 is also coupled to both the input/output component 124 of the unit controller 118 and to the main processing unit 119. The wired element 128 is configured to couple the computing unit 104 to the data network 108 via a hardwire communication medium (e.g., fiber optic cables). In certain embodiments, the wired element 128 can include a network interface card, network adapter, and/or other computer hardware configured to allow physically access to a networking medium. Though not shown in FIG. 2, the wired element 128 can also include a bridge, switch, router, firewall, and/or other suitable types of networking component.

As shown in FIG. 2, the motherboard 101 can also include at least one of a power supply 111, a sensor 113 (e.g., a temperature or humidity sensor), and a cooling fan 115 (collectively referred to as "peripheral devices") coupled to the input/output component 124 of the unit controller 118. The peripheral devices can provide input to as well as receive instructions from the unit controller 118 via the input/output component 124. For example, the power supply 111 can provide power status, running time, wattage, and/or other suitable information to the unit controller 118. In response, the unit controller 118 can provide instructions to the power supply 111 to power up, power down, reset, power cycle, refresh, and/or other suitable power operations. In another example, the cooling fan 115 can provide fan status to the unit controller 118 and accept instructions to start, stop, speed up, slow down, and/or other suitable fan operations. In further embodiments, the motherboard 101 may include additional and/or different peripheral devices.

In example operation, the main processing unit 119 receives requested tasks from the client device 110 via the wired element 128. The main processing unit 119 then performs the requested tasks and routes generated network data to the client device 110 with the wired element 128 via the data network 108. Meanwhile, in one embodiment, the unit controller 118 can monitor the conditions of components of the computing unit 104 and transmitting the conditions to the management controller with the wireless element 126 via the management network 112. In other embodiments, the unit controller 118 can also transmit the conditions to the management controller with the wired element 128 via the data network 108. In such embodiments, the wireless management network 112 may be used as a backup for the data network 108. In further embodiments, the unit controller 118 can transmit the conditions to the management controller with both the wired element 128 and the wireless element 126 via a combination of the data network 108 and the management network 112.

When the unit controller 118 detects a failure of the wired element 128, the unit controller 118 can allow the main processing unit 119 to continue operating. The unit controller 118 may then route network data with the wireless element 126 via the wireless management network 112. The unit controller 118 can also report the failure to the management controllers for further processing. In response, the unit controller 118 can receive operating instructions from the management controllers and/or a system administrator of the datacenter 100 via the wireless management network 112. The processor 120 of the unit controller 118 can then process the received instructions, generate commands for device operation, and transmit the generated commands to a suitable component for execution. For example, the processor 120 may instruct the cooling fan to turn on or to instruct the power supply 111 to cycle power. Several embodiments of software components of the processor 120 are described in more detail below with reference to FIG. 3. Even though the computing unit 104 is shown in FIG. 2 as having the wired element 128 coupled to the data network 108, in further embodiments, the computing unit 104 may also include a wireless component coupled to the data network 108.

Figure 3:
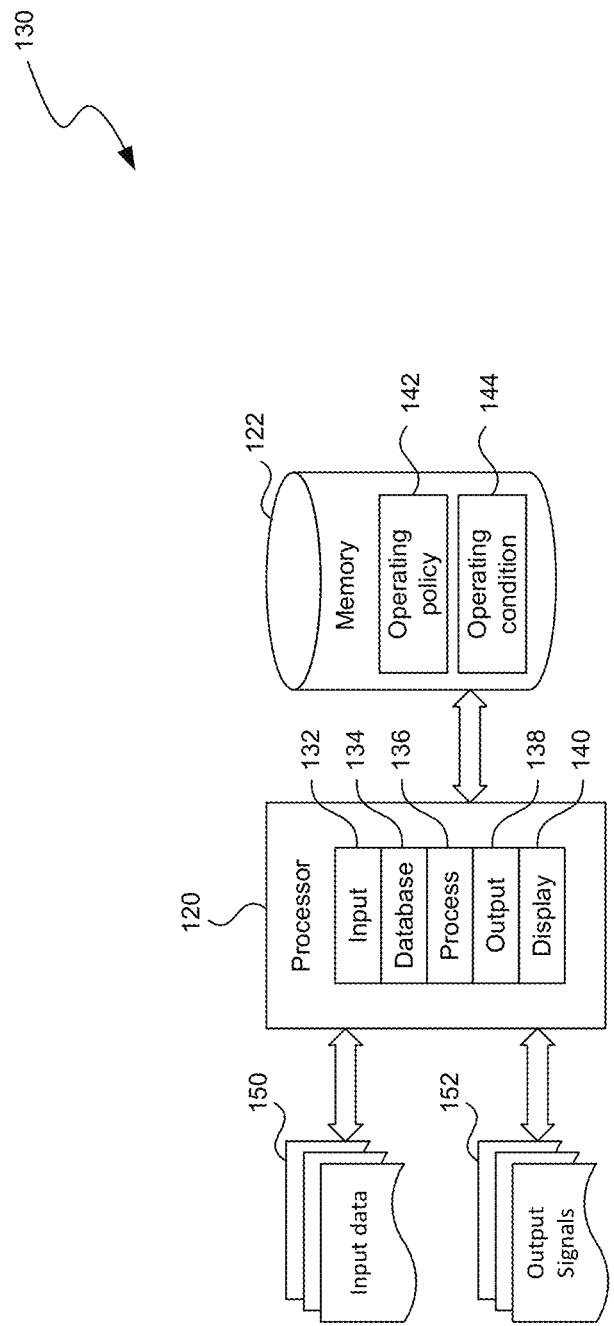
FIG. 3 is a block diagram showing computing software modules suitable for the processor of FIG. 2 in accordance with embodiments of the present technology.

FIG. 3 is a block diagram showing computing system software components 130 suitable for the unit controller 118 in FIG. 2 in accordance with embodiments of the present technology. Each component may be a computer program, procedure, or process written as source code in a conventional programming language, such as the C++ programming language, or other computer code, and may be presented for execution by the processor 120 of the unit controller 118. The various implementations of the source code and object byte codes may be stored in the memory 122. The software components 130 of the unit controller 118 may include an input module 132, a database module 134, a process module 136, an output module 138, and an optional display module 140 interconnected with one another.

In operation, the input module 132 can accept input data 150 (e.g., sensor readings from the sensor 113 in FIG. 2), and communicates the accepted input data to other components for further processing. The database module 134 organizes records, including an operating policy 142 and an operating condition 144, and facilitates storing and retrieving of these records to and from the memory 122. The operating policy 142 may include instructions for device operation based on presence of certain conditions. The operating condition 144 may include temperature, humidity, power, and/or other suitable operating parameters of the computing unit 104. Any type of database organization may be utilized, including a flat file system, hierarchical database, relational database, or distributed database, such as provided by a database vendor such as the Microsoft Corporation, Redmond, Wash.

The process module 136 analyzes the input data 150 from the input module 132 and/or other data sources, and the output module 138 generates output signals 152 based on the analyzed input data 150. The processor 120 may include the optional display module 140 for displaying, printing, and/or downloading the input data 150, the output signals 152, and/or other information via the input/output component 124 (FIG. 2). Embodiments of the process module 136 are described in more detail below with reference to FIG. 4.

Figure 4:
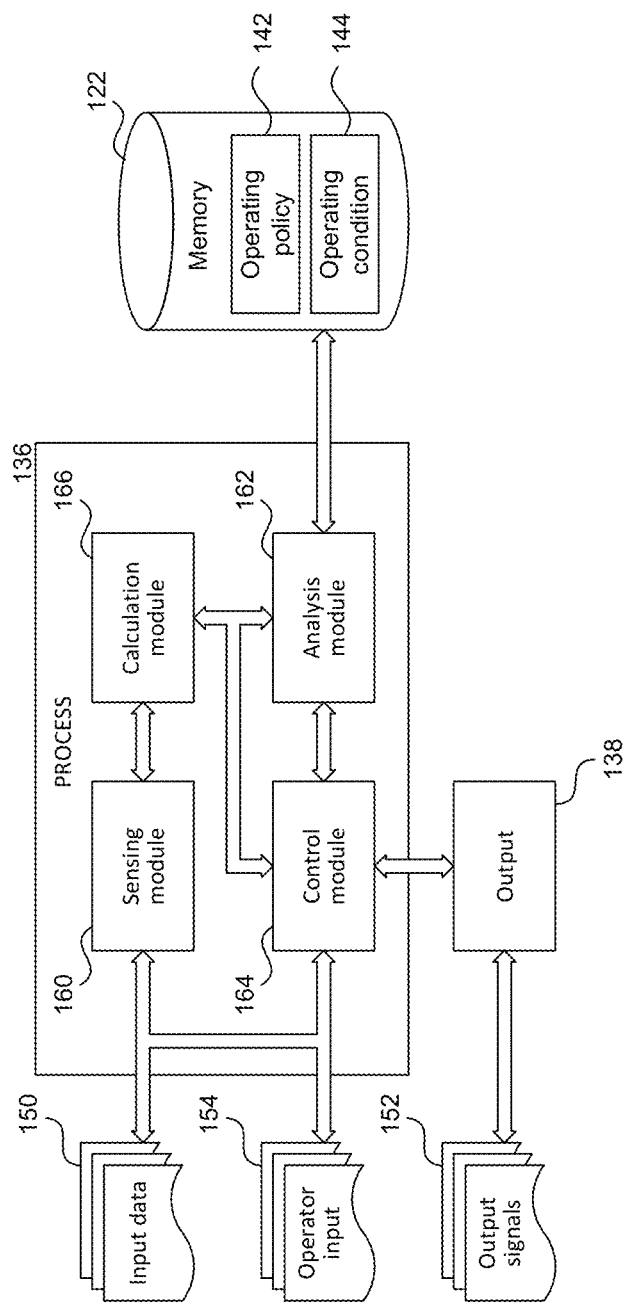
FIG. 4 is a block diagram showing software modules suitable for the process component of FIG. 3 in accordance with embodiments of the present technology.

FIG. 4 is a block diagram showing embodiments of the process module 136 in FIG. 3. As shown in FIG. 4, the process module 136 may further include a sensing module 160, an analysis module 162, a control module 164, and a calculation module 166 interconnected with one other. Each module may be a computer program, procedure, or routine written as source code in a conventional programming language, or one or more modules may be hardware modules.

The sensing module 160 is configured to receive the input data 150 and converting the input data 150 into suitable engineering units. For example, the sensing module 160 may receive an input from the sensor 113 (FIG. 2) and convert the received input to a temperature in Celsius. In another example, the sensing module 160 may receive an input from the cooling fan 115 and convert the received input to a digital value of ON or OFF. In further examples, the sensing module 160 may perform other suitable conversions.

The calculation module 166 may include routines configured to perform various types of calculations to facilitate operation of other modules. For example, the calculation module 166 can include routines for averaging a temperature received from the sensing module 160. In other examples, the calculation module 166 can include linear regression, polynomial regression, interpolation, extrapolation, and/or other suitable subroutines. In further examples, the calculation module 166 can also include counters, timers, and/or other suitable routines.

The analysis module 162 can be configured to analyze the calculated parameters from the calculation module 166 and determine if the computing unit 104 (FIG. 2) is operating under normal conditions. For example, the analysis module 162 may compare the average temperature (or current temperature) from the calculation module 166 to a predetermined threshold. If the average temperature exceeds the threshold, the analysis module 162 can indicate a high-temperature alarm. In other examples, the analysis module 162 can perform other suitable analysis.

The control module 164 may be configured to control the operation of the computing unit 104 based on analysis results from the analysis module 162. For example, in one embodiment, if the analysis module 162 indicates a high-temperature alarm, the control module 164 can generate an output signal 152 to turn on the cooling fan 115 and provide the instruction to the output module 138. In other embodiments, the control module 164 may also generate output signal 152 based on operator input 154 and/or other suitable information.

Even though the unit controller 118 is described above to perform the monitoring and/or control functions for the computing unit 104 in FIGS. 2-4, in other embodiments, at least some of the monitoring and/or control functions may be performed by an operating system and/or application of the main processing unit 119. In further embodiments, the computing unit 104 may not include the wireless element 126 and the antenna 127. Instead, several computing units 104 may share one wireless element 126, as described in more detail below with reference to FIG. 5.

Figure 5:
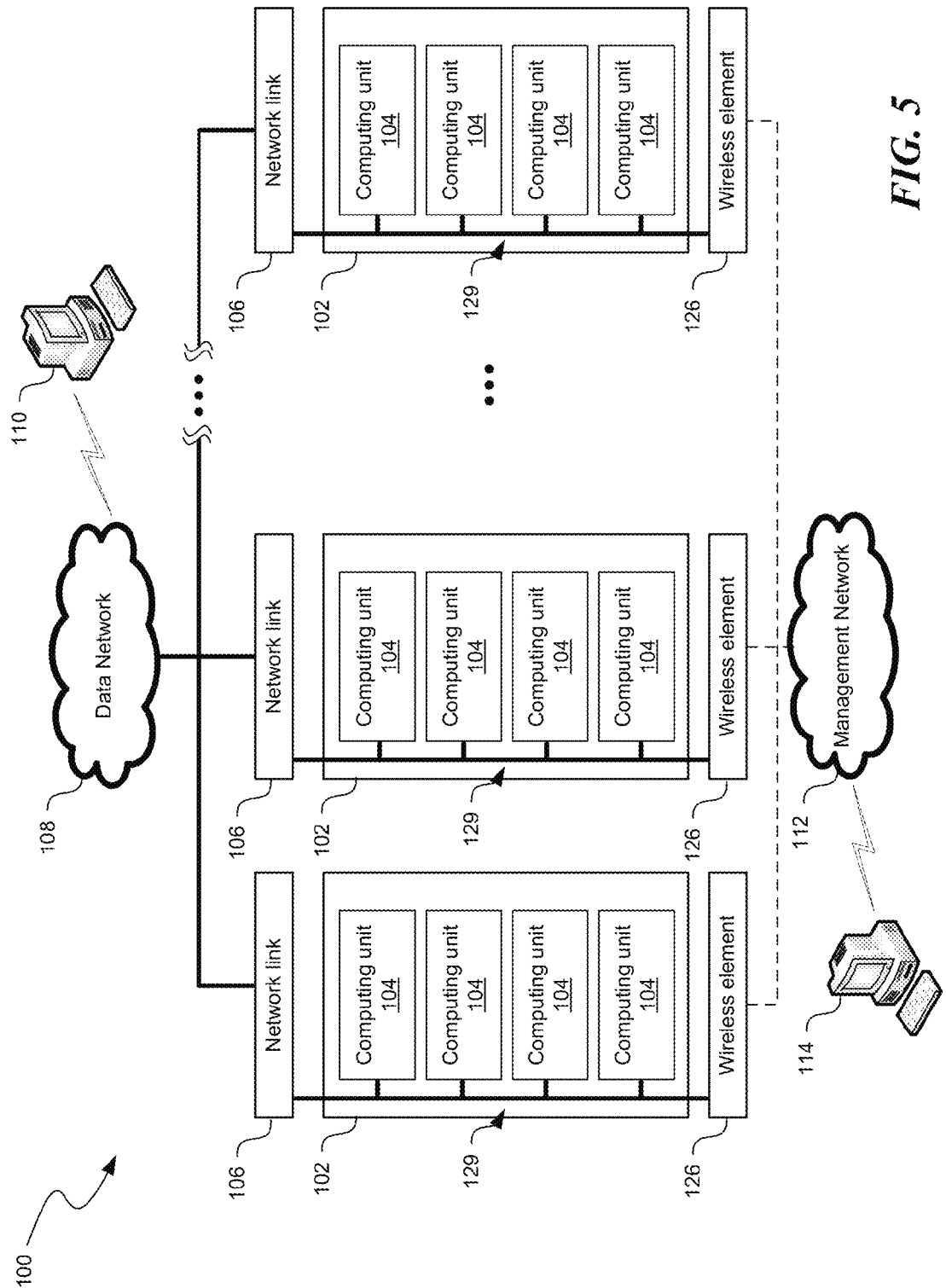
FIG. 5 is a schematic block diagram illustrating another network system in accordance with embodiments of the present technology.

FIG. 5 is a schematic block diagram illustrating another communication framework in a datacenter 100 in accordance with embodiments of the present technology. The datacenter 100 in FIG. 5 can be generally similar in structure and function as that in FIG. 1 except that each computer cabinet 102 include one wireless element 126 coupled to all computing units 104. As shown in FIG. 5, the computing units 104 are aggregated with a wired link 129, which is in turn coupled to a corresponding wireless element 126. As a result, the computing units 104 in each of the computer cabinets 102 share a single wireless element 126. Even though not shown in FIG. 5, in other embodiments, two, three, or any other suitable number of computing units 104 in a rack, cabinet, or room may be coupled to a corresponding wireless element 126. In further embodiments, the datacenter 100 may have other suitable configurations of wireless elements 126.

Figure 6:
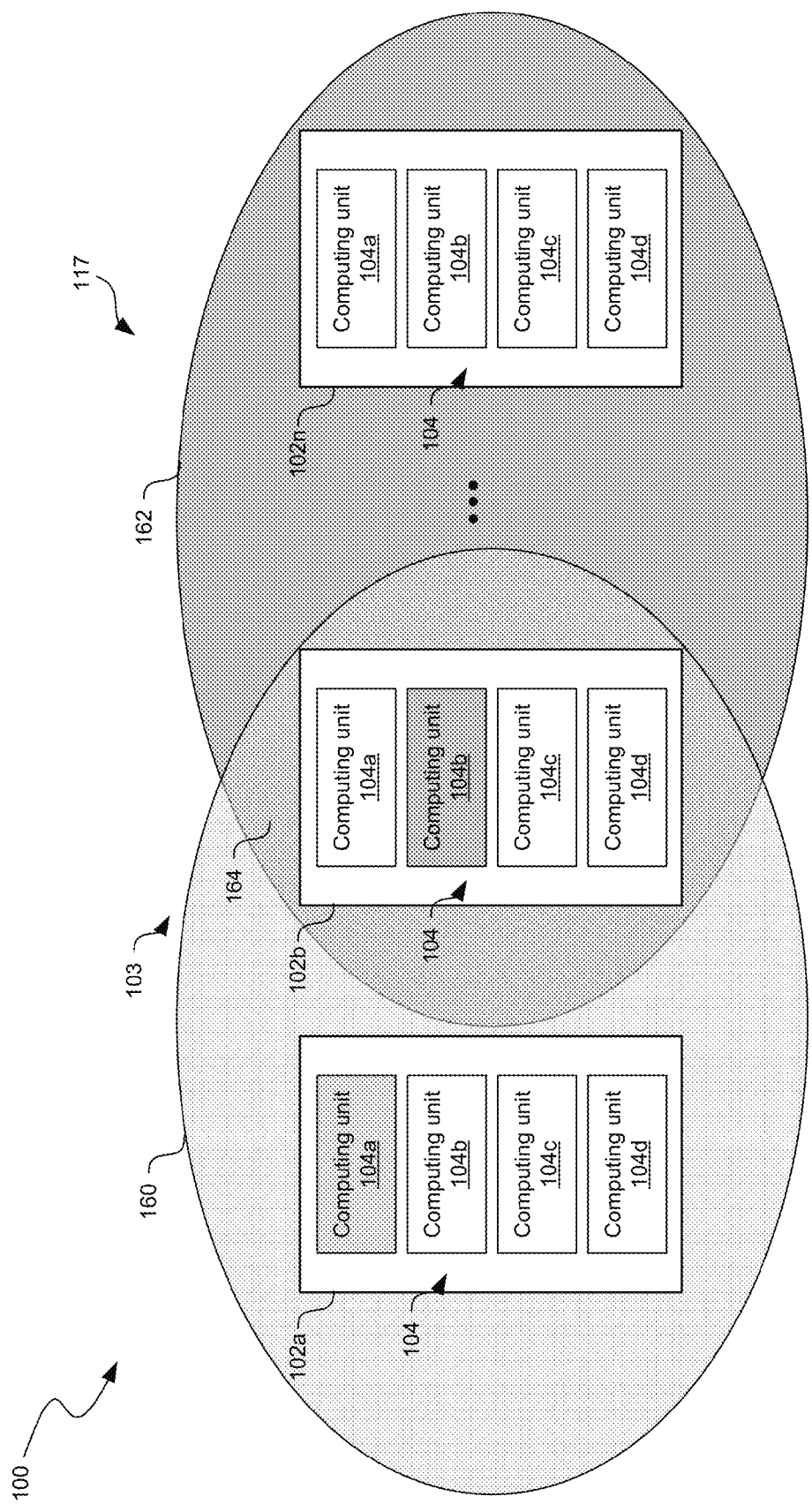
FIG. 6 is a Venn diagram illustrating an arrangement of management controllers in accordance with embodiments of the present technology.

FIG. 6 is a Venn diagram illustrating an arrangement of management controllers in a datacenter 100 in accordance with embodiments of the present technology. As shown in FIG. 6, a first computing unit 104a in a first computer cabinet 102a is designated as a primary management controller. A second computing unit 104b in a second computer cabinet 102b is designated as a secondary management controller. The first computing unit 104a has a first wireless range 160, and the second computing unit 104b has a second wireless range 162.

As shown in FIG. 6, the first wireless range 160 does not reach the computer cabinet 102n. In one embodiment, the first computing unit 104a can use the secondary management controller as a relay or hop to reach the computing units 104a-104d in the nth computer cabinet 102n. In other embodiments, the first computing unit 104a can use any other computing units 104a-104d in the second computer cabinet 102b as a hop to reach the computing units 104a-104d in the nth computer cabinet 102n. In further embodiments, the first computing unit 104a may also use one or more repeaters (e.g., wireless routers or switches) as a hop to reach the computing units 104a-104d in the nth computer cabinet 102n.

In the event of a failure in one of the management controllers, any one of the computing units 104 may substitute for the failed management controller. For example, as shown in FIG. 6, if the first computing unit 104a in the first computer cabinet 102a fails, the first computing unit 104a and the second computer cabinet 102b may be designated as the primary or secondary management controllers. In certain embodiments, the substitute computing unit 104 may be selected based on a coverage area of the computing unit. For example, the substitute computing unit 104 may be selected to have a coverage area above a target threshold (e.g., an area, a number of computing units 104, and/or other suitable coverage parameters). In other embodiments, the substitute computing units 104 may be selected based on other suitable criteria.

Figure 7:
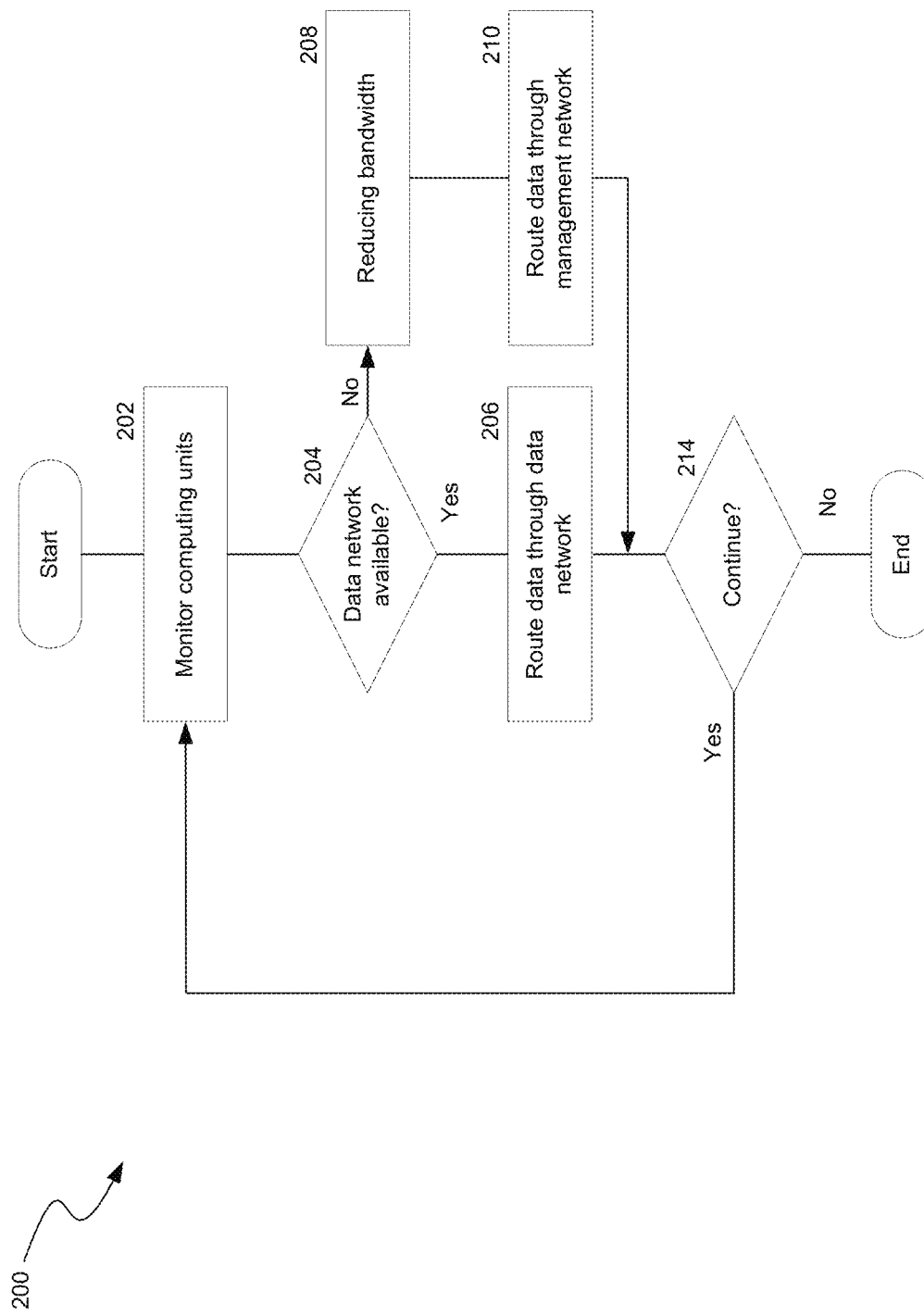
FIG. 7 is a flow diagram illustrating a process for routing communication traffic when a data network is unavailable in accordance with embodiments of the present technology.

FIG. 7 is a flow diagram illustrating a process 200 for routing communication traffic when a data network is unavailable in accordance with embodiments of the present technology. Even though the process 200 is described below with reference to the datacenter 100 in FIG. 1, several embodiments of the process 200 may also be used in other datacenters and/or suitable computer systems.

As shown in FIG. 7, one stage of the process 200 can include monitoring a computing unit in the datacenter at stage 202. In one embodiment, monitoring the computing unit can include monitoring current conditions of as well as available communication networks for the computing unit. The process 200 then includes a decision stage 204 to determine if a data network is available. If a data network is available, the process 200 proceeds to routing network data through the data network at stage 206.

If a data network is not available, the process 200 includes continuing operation and reducing a bandwidth demand for the computing unit at stage 208. In one embodiment, reducing the bandwidth demand can include assigning certain none- or low-bandwidth demanding tasks to the computing unit. In other embodiments, reducing the bandwidth demand can also include reducing a CPU power of the computing unit. The process 200 then includes routing data through a wireless management network independent of the data network at stage 210.

The process 200 then includes a decision stage 214 to determine if the process continues. In one embodiment, the process 200 continues if the computing unit is still operating. In other embodiments, the process 200 can continue based on other suitable criteria. If the process continues, the process reverts to monitoring the computing unit at stage 202; otherwise, the process ends.

Figure 8:
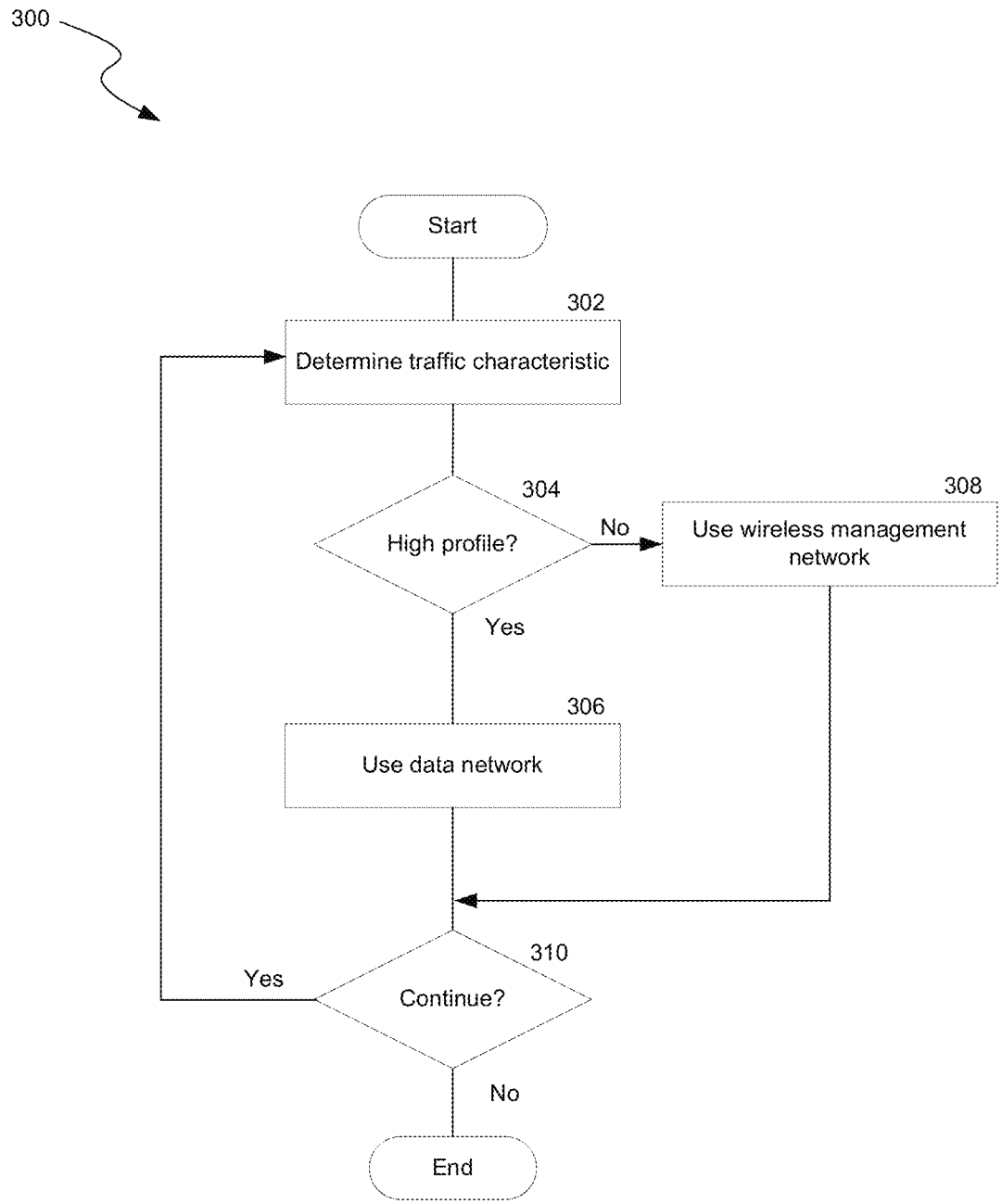
FIG. 8 is a flow diagram illustrating a process for routing communication traffic using both a data network and a management network in accordance with embodiments of the present technology.

FIG. 8 is a flow diagram illustrating a process 300 for routing communication traffic using both a data network and a management network in accordance with embodiments of the present technology. As shown in FIG. 8, the process 300 includes determining a traffic characteristic at stage 302. In one embodiment, determining the traffic characteristic can include determining at least one of a priority, latency, and/or other characteristics of the traffic. In other embodiments, determining the traffic characteristic can be based on other suitable criteria.

The process 300 then includes a decision stage 304 to determine if the traffic characteristic indicates a high profile traffic based on predetermined criteria. For example, in one embodiment, the determined traffic is high profile when it has high priority, low latency, and/or other suitable characteristics. If the determined traffic is high profile, the process 300 includes using a data network to route the traffic at stage 306. If the determined traffic profile is not high profile, the process 300 includes using a wireless management network to route the traffic at stage 308. Then the process 300 includes a decision stage 310 to determine if the process should continue. If the process continues, the process reverts to determining the traffic characteristic at stage 302; otherwise, the process ends.

Figure 9:
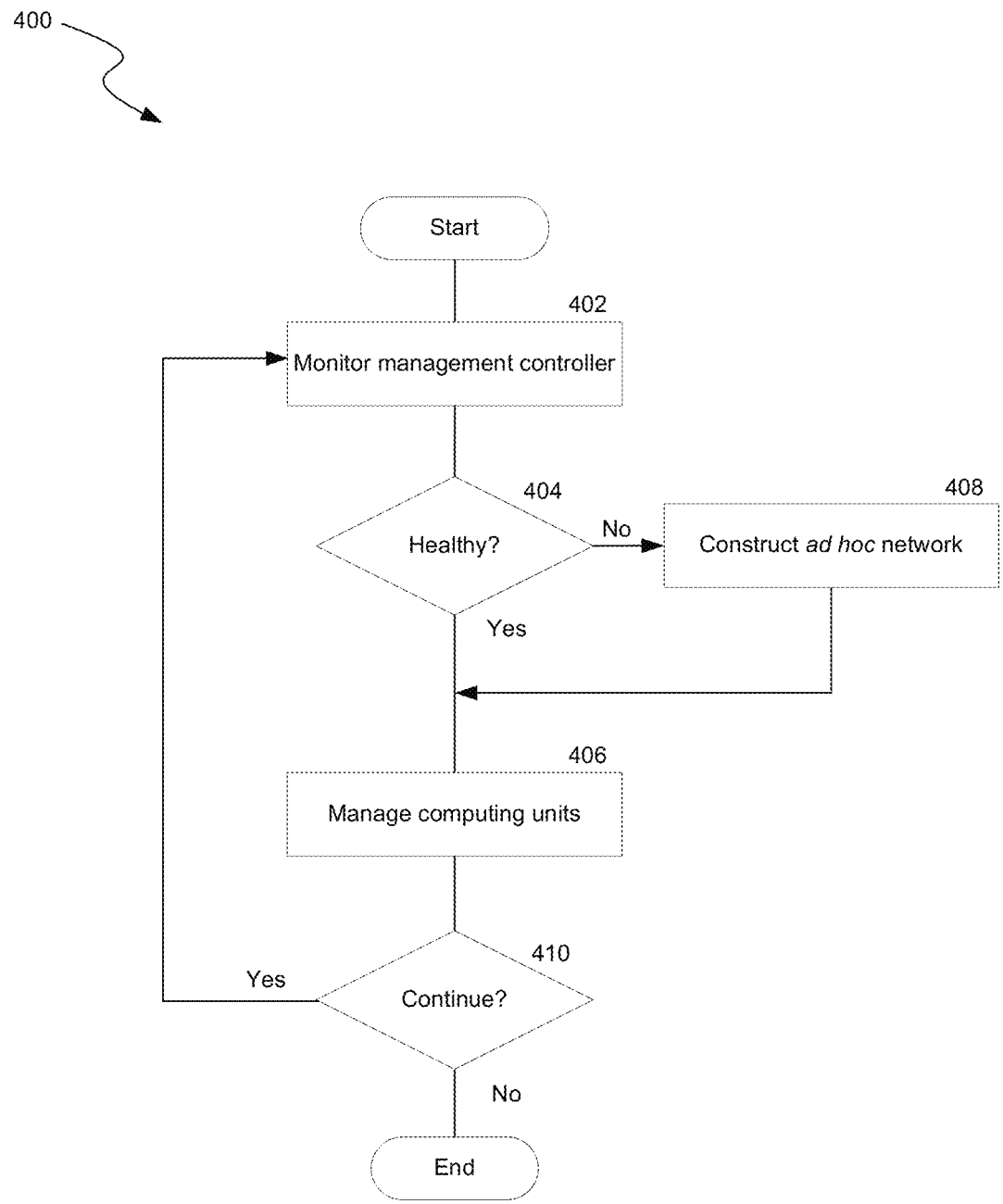
FIG. 9 is a flow diagram illustrating a process for maintaining management redundancy in a computer system in accordance with embodiments of the present technology.

FIG. 9 is a flow diagram illustrating a process 400 for maintaining management redundancy in a datacenter in accordance with embodiments of the present technology. As shown in FIG. 9, the process 400 includes monitoring a condition (e.g., availability) of a management controller at stage 402. The process 400 then includes a decision stage 404 to determine if the management controller is still healthy (e.g., online and operating). If the management controller is healthy, the process 400 includes managing computing units with the current management controller at stage 406. If the management controller is not healthy (e.g., offline and not responding to communication), the process 400 includes constructing an ad hoc network at stage 408. When constructing the constructed ad hoc network, a computing unit can be selected to replace the failed management controller randomly or based on predetermined criteria. For example, a computing unit may be selected to cover a number of computing units above a predetermined threshold. The process 400 then includes managing computing units with the computing unit selected as the replacement management controller at stage 406. Process 400 can then include a decision stage 410 to determine if the process should continue. If the process continues, the process 400 reverts to monitoring the management controller at stage 402; otherwise, the process ends.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A network system, comprising:
   a computing unit; and
   a management controller configured to control a device operation of the computing unit, the device operation including at least one of an operation to power up, an operation to power down, an operation to reset, an operation to power cycle, or an operation to refresh the computing unit;
   wherein the computing unit includes:
   a wireless element configured to allow wireless communication between the computing unit and the management controller over a management network; and
   a wired element configured to allow wired communication between the computing unit and a client device over a data network that is independent from the management network; and
   wherein the management controller is also configured to route network data to the client device over the management network via the wireless element and reduce a communication bandwidth demand for routing the network data below a prior level in response to detecting a loss of connection to the data network at the computing unit.

2. The network system of claim 1 wherein the management controller is configured to control device operation of the computing unit without an operating system running on the computing unit.

3. The network system of claim 1 wherein the computing unit is a first computing unit, and wherein the wireless element is also associated with a second computing unit.

4. The network system of claim 1 wherein:
   the management controller is a primary management controller; and
   the network system further includes a secondary management controller in wireless communication with the primary management controller and with the computing unit, the secondary management controller being configured as a backup for the primary management controller.

5. The network system of claim 1 wherein:
   the computing unit is a first computing unit;
   the management controller is a primary management controller residing on the first computing unit; and
   the network system further includes a secondary management controller configured as a backup for the primary management controller, the secondary management controller residing on a second computing unit in range of the wireless element associated with the first computing unit.

6. The network system of claim 1 wherein:
   the computing unit is a first computing unit;
   the wireless element is a first wireless element;
   the management controller is a primary management controller residing on the first computing unit;
   the network system further includes
   a secondary management controller configured as a backup for the primary management controller, the secondary management controller residing on a second computing unit associated with a second wireless element, the second wireless element being in range of the first wireless element;
   a third computing unit associated with a third wireless element, the third wireless element being in range of the second wireless element but not of the first wireless element; and
   the primary management controller is configured to access the third computing unit using the second wireless element as a relay.

7. The network system of claim 1 wherein the computing unit includes a unit controller configured to control device operation of a main processing unit of the computing unit, and wherein the wireless element is integrated into the unit controller and operatively coupled to the main processing unit.

8. The network system of claim 1 wherein:
   the computing unit includes:
   a unit controller configured to control device operation of a main processing unit of the computing unit; and wherein
   the wired element is coupled to both the unit controller and the main processing unit; and
   the wireless element is integrated into the wired element and operatively coupled to both the unit controller and the main processing unit.

9. A method of operating one or more computing units, the method comprising:
   wirelessly transmitting an instruction to the one or more computing units from a management controller in a management network, the one or more computing units are configured to transmit network data to one or more client devices over a data network that is independent from the management network; and
   monitoring an operating condition and controlling a device operation of the one or more computing units based on the monitored operating condition with the wirelessly transmitted instruction, the device operation including at least one of an operation to power up, an operation to power down, an operation to reset, an operation to power cycle, or an operation to refresh the computing unit, wherein monitoring the operating condition includes:
   detecting a loss of connection of one of the computing units from the data network;
   in response to detecting the loss of connection of the one of the computing units from the data network, transmitting another instruction to the one of the computing units to:
   divert transmission of the network data from the data network to the management network; and
   reduce a communication bandwidth demand for routing the network data below a prior level.

10. The method of claim 9 wherein controlling the device operation includes:
    controlling device operation of the one of more computing units even without an operating system running on the one or more computing units.

11. The method of claim 9 wherein wirelessly transmitting the instruction includes:
wirelessly transmitting the instruction to the one or more computing units via a wireless element associated with one or more of the computing units.

12. The method of claim 9, further comprising:
utilizing the management network for at least one of communication load balancing, peer-to-peer communication, or background traffic.

13. The method of claim 9, further comprising:
determining a characteristic of a pending communication traffic; and
directing the pending communication traffic to at least one of the data network or the management network based on the determined characteristic.

14. The method of claim 9 wherein monitoring the operating condition and controlling device operation includes monitoring at least one of a temperature, humidity, cooling fan status, or power status of the individual computing units using the management network.

15. The method of claim 9, further comprising if the management controller fails, replacing the failed management controller with one of the one or more computing units.

16. The method of claim 9, further comprising if the management controller fails, selecting one of the one or more computing units having a target wireless coverage area to replace the failed management controller.

17. A computer system, comprising:
a plurality of computing units individually include:
a wireless element configured to allow wireless communication between the computing unit and the management controller over a management network; and
a wired element configured to allow wired communication between the computing unit and a client device over a data network that is independent from the management network;
a data network coupled to the plurality of computing units, the data network including at least one of a hardwire or wireless medium configured to carry network data to and from the plurality of computing units; and
a management network independent of the data network, the management network including a wireless medium configured to allow wireless monitoring and controlling of device operation of the individual computing units even without an operating system running on the individual computing units, wherein the management controller is also configured to route network data to the computing units over the management network via the wireless element of the individual computing units and reduce a communication bandwidth demand for routing the network data below a prior level in response to detecting a loss of connection to the data network at the individual computing units, wherein the management controller is also configured to route network data to the computing units over the management network via the wireless element of the individual computing units and reduce a communication bandwidth demand for routing the network data below a prior level in response to detecting a loss of connection to the data network at the individual computing units.

18. The computer system of claim 17 wherein the management network is configured to establish and access the computing units through a path in the management network on an ad hoc basis.

19. The computer system of claim 17 wherein:
the management network includes a management controller wirelessly coupled to the plurality of computing units; and
if one of the computing units loses connection to the data network, the computer system is configured to route network data to and from the one of the computing units using the management network.

20. The computer system of claim 17 wherein:
the management network includes a primary management controller and a secondary management controller wirelessly coupled to the plurality of computing units;
the secondary management controller is configured as a backup for the management controller; and
when one of the primary or secondary controller fails, the management network is configured to replace the failed one of the primary or secondary controller with one of the plurality of computing units.

* * * * *